Oct. 17, 1967   H. P. GONYEA   3,347,392
COMBINATION STRUCTURE
Filed July 28, 1965   2 Sheets-Sheet 1

INVENTOR.
Harold P. Gonyea
BY
Albert H. Reuther
His Attorney

Oct. 17, 1967

H. P. GONYEA 3,347,392

COMBINATION STRUCTURE

Filed July 28, 1965

INVENTOR.
Harold P. Gonyea
BY
Albert H. Reuther
His Attorney

United States Patent Office 3,347,392
Patented Oct. 17, 1967

3,347,392
COMBINATION STRUCTURE
Harold P. Gonyea, Birmingham, Mich., assignor to General Motors Corporation, Detroit, Mich., a corporation of Delaware
Filed July 28, 1965, Ser. No. 475,469
7 Claims. (Cl. 211—26)

ABSTRACT OF THE DISCLOSURE

This invention relates to an extruded elastomeric material of substantially constant cross section which includes an integral crash-pad bumper, edge trim and conductor enclosure which fits over the edge of a shelf.

---

This invention relates to an elastomeric strip means and, more particularly, to combination crashpad-bumper and edge trim as well as wiring harness enclosure structure.

Vehicle panels often have blunt edges and require mounting of electrical components therewith. A minimum cost for material and parts is necessary. Avoidance of excessive labor and maintenance is also sought. Yet safety requirements must also be met. An object of the present invention is to provide a longitudinal extrusion of elastomeric material that serves as a bumper along edging of a mounting panel as well as for wiring retention in combination therewith.

Another object of this invention is to provide a vehicle package rack suitably braced and having a downward blunt edging. Along this edging there is installed a longitudinally continuous elastomeric combination crashpad-bumper and edge trim as well as wiring harness enclosure structure.

A further object of this invention is to provide a vehicle shelf having a lamp mounting recess along an underside in a location adjacent to a downward blunt edging. A hidden wiring harness means connected for predetermined electrical lamp or other component energization is retained by a resilient lip portion of elastomeric strip means. This elastomeric strip means further includes lip portions which sealingly engage a substantially L-shaped member or bracket secured to the blunt edging. An internal void-forming portion of the elastomeric strip means forms a softened crashpad or bumper configuration integrally in combination with the harness retaining lip portion.

Another object of this invention is to provide a continuous elastomeric finish strip means having a multilip cross-sectional configuration including a C-shaped portion or groove open longitudinally as to specific wiring retention therein. Further lip portions engage mounting panel means along edging thereof. An intermediate elastomeric portion has longitudinally recessing therein to enhance flexibility and softness as a bumper and crashpad structure around panel edging or corners in combination with wiring retention.

Further objects and advantages of the present invention will be apparent from the accompanying drawings wherein preferred embodiments are clearly shown.

Figure 1:
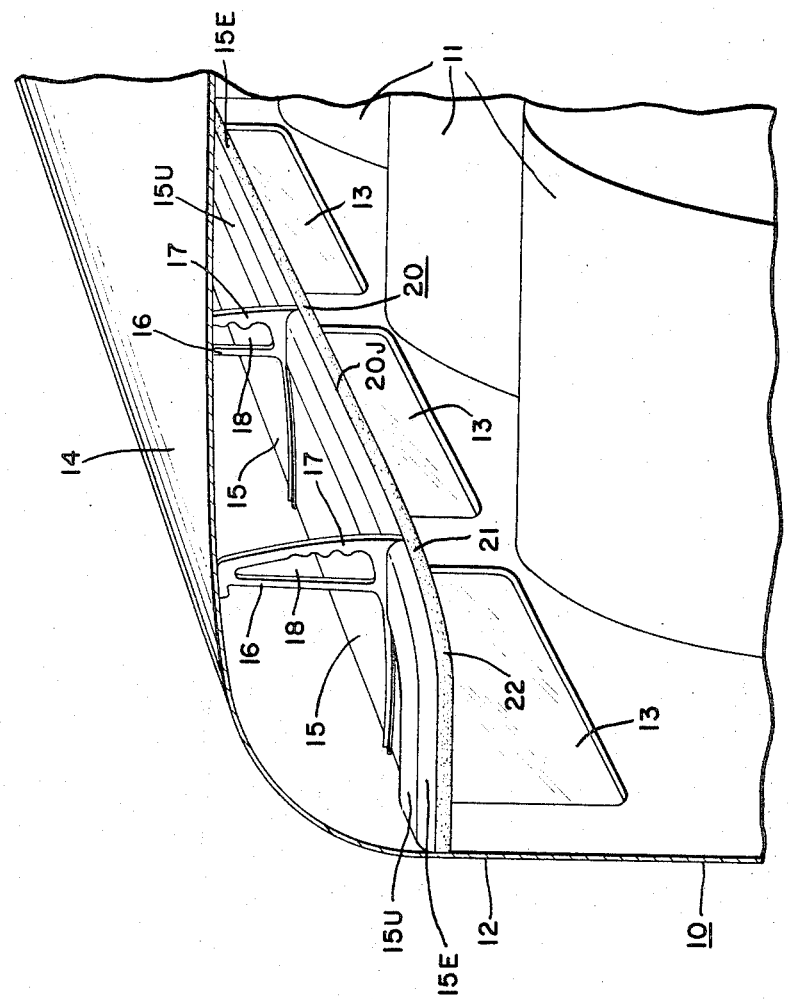
FIGURE 1 is a fragmentary perspective view of combination structure having features in accordance with the present invention.
Figure 2:
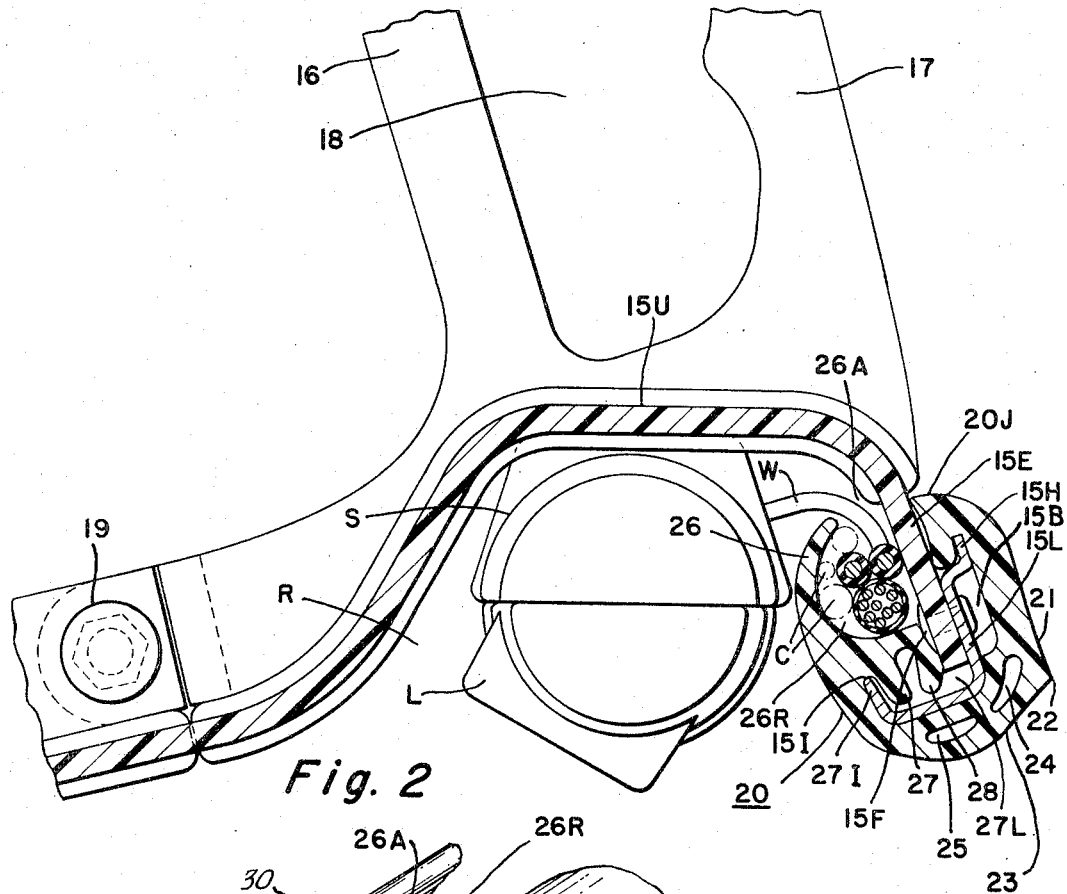
FIGURE 2 is a fragmentary cross-sectioned view of structure in FIGURE 1.

In FIGURE 1 a fragment of a vehicle such as a coach, bus, train car, airline frame and the like generally indicated by numeral 10 is shown. This vehicle includes a plurality of passenger seats 11 on one side of a partition or wall 12 provided with transparent viewing areas 13 as well as a cover or roof portion 14. Quite often, passengers in such a vehicle will bring with them relatively small packages or pieces of luggage and other personal belongings which are suitably placed on a shelf or rack portion 15 suitably secured to an interior surfacing of the vehicle. Such a shelf or rack portion is generally provided with a substantially L-shaped bracket means 16. This bracket means 16 is secured internally to the cover or roof portion 14 and transversely of the shelf or rack portion. Each of the bracket means 16 illustrated in FIGURE 1 is provided with a hand grip portion 17 adjacent to an opening or cutout 18. Suitable bolts or fasteners 19 illustrated in FIGURE 2 are provided for assembly of the support bracket and shelf portions which possibly are segmented to facilitate production assembly and replacement. Such segmental shelf portions collectively form a substantially U-shaped channel 15U which terminates in a blunt edging or end flange portion 15E shown in FIGURES 1 and 2.

A suitable L-shaped member or bracket 15L is secured by rivets or fastening means 15F to the blunt edging 15E of the shelf or rack portion. This bracket member 15L includes an elbow-shaped hanger extension 15H as well as a lower or internal terminating flange end 15I as illustrated in FIGURE 2.

Figure 3:
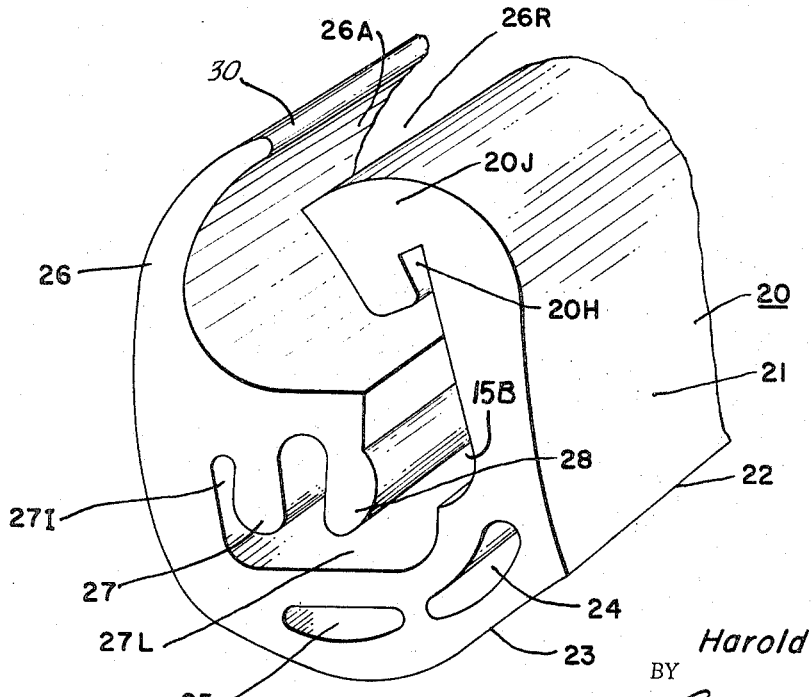
FIGURE 3 is an enlarged perspective and sectional view of elastomeric strip means having combination crashpad and wiring retention features utilized as shown by FIGURES 1 and 2.

In accordance with the present invention, a combination structure generally indicated by numeral 20 in FIGURES 1, 2 and 3 is fitted to the blunt edging 15E as well as the bracket means 15L secured thereto. The combination structure 20 is made of an extruded elastomeric material such as natural or synthetic rubber, vinyl, plastic and the like. Similarly the shelf or rack portions also formed of such insulating material has a configuration forming a recess R along an underside thereof as shown in FIGURE 2. A suitable socket S having a lens portion L for a lamp bulb means therein is suitably mounted in this recess. The socket for the lamp bulb means is suitably secured to the shelf or rack portion and a wiring means W eminating from a harness or collection of a plurality of conductors C assure provision for electrical energization of the lamp bulb means as well as other electrical fixtures. For example, the conductor means C can also provide electrical connection for a warning buzzer or bell often used by passengers or occupants to indicate to a vehicle operator that a particular stop is desired or that a hostess should come to that particular seat for food service or other reasons.

The combination structure 20 includes an upper J-shaped portion 20J which provides a recess 20H which is complementary to the hanger extension 15H of the L-shaped bracket means 15L. The portion 20J includes an outer surfacing 21 which terminates in a juncture 22 with a bumper portion 23 having formation of internal voids or recesses 24 and 25 therein for resilience. This bumper portion 23 as well as a bumper cavity 15B have a location backed and internally reinforced by the L-shaped bracket means such that the voids or recesses 24–25 are located substantially along an underside as protection against a passenger head or shoulder bumping into the bracket means an/or blunt-edging portion of the rack or shelf.

The combination structure 20 further includes an integral C-shaped channel forming portion 26 which terminates in an upper free end 30. This channel forming portion 26 includes a pair of downwardly extending lip portions 27 and 28. The lip portion 28 engages the blunt edging 15E along an inner lower surfacing thereof. The lip portion 27 is longitudinally substantially parallel to the lip portion 28 though laterally to one side thereof and forming a recessing 27I which is complementary to the inner ending 15I of the bracket means 15L. The bracket means 15L fits into a longitudinally extending L-shaped space or recess 27L shown in FIGURES 2 and 3. Recessing 26R into which wiring W and conductor or harness means C are fitted as shown in FIGURE 2 also will be defined by the combination structure in addition to an access opening 26A thereto adjacent to resiliently deflectable ending 30 of the C-shaped portion 26. Thus the combination structure 20 provides a longitudinally continuous elastomeric crashpad-bumper portion 23 as well as edge trim 21–22 and wiring harness enclosure structure including the portion 26. The internal grooves, recessing and channel fit complementary to the blunt edging and bracket means though simultaneously fulfilling a plurality of functions. The combination structure 20 as extruded or molded of elastomeric material is made with a predetermined color configuration therein. Also, reference is made to a patent 3,082,491–Millhouse et al. issued Mar. 26, 1963 to the assignee of the present invention and disclosing use of transparent plastic materials in which metal foil has been embedded for trim and seal purposes. Such transparent plastic material having vaporized metal and/or foil therewith also would be suitable for the combination structure 20 of the present invention.

The combination structure 20 of the present invention has a wiring harness support or conduit portion in conjunction with the resilient crashpad or bumper portion having the voids or recessing therein as described. This entire combination structure 20 is made of extruded elastomeric material of natural or synthetic rubber for example having a shape or cross section which is self sustaining with or without use of adhesives when applied to the supporting member or bracket means. The combination structure 20 of the present invention provides easy access for maintenance of wiring or conductors as well as for inspection thereof. The harness enclosure is made as part of a safety component such as a crashpad or bumper as well as incorporating trim appearance features. The wiring or harness is readily installed in the channel or recess-forming portion integral with the crash pad or bumper and trim configuration while eliminating mechanical fasteners for harness installation. The longitudinally extruded or molded elastomeric strip means is sufficiently resilient to follow predetermined curvature or other change in direction of panel edging. The combination structure 20 provides a continuous finish strip for metal or insulating material of shelf structure. It is to be understood that the shelf structure per se can be segmented and joined by interconnecting I-shaped strips which are located transversely as to the finish strip. An example of extruded elastomeric compound suitable for the combination structure 20 is a black composition of ethylene, propylene and terpolymer having a tensile strength of one thousand pounds per square inch. The cavities or voids 24 and 25 assure resilience in the bumper portion of the combination structure and this is important as to the safety of passengers or occupants who also are shielded from the wiring in the groove or recess 26R by the channel-forming portion 26 and inward termination of the ending 30 thereof. It is to be understood that a plurality of leads or "pigtail" connections from the harness are possible due to provision of the access 24A to the conduit portion of the structure. The combination crashpad-bumper and edge trim as well as harness support is particularly advantageous since the panel to which this structure is attached has edging thereof covered regardless of roughness due to stamping and/or blunt termination thereof.

While the embodiments of the present invention as herein disclosed constitute preferred forms, it is to be understood that other forms might be adopted.

What is claimed is as follows:

1. On a vehicle package rack suitably braced and having a downward blunt edging to which a substantially L-shaped bracket is secured, a continuous longitudinally extending elastomeric combination crashpad-bumper and edge trim as well as wiring harness enclosure structure, comprising, an extruded body of insulating material integrally including a trim-edge portion which fits over one side of said L-shaped bracket, an intermediate void-forming crashpad-bumper portion, and a channel-forming portion having wiring harness access thereto.

2. The structure of claim 1 wherein a pair of voids are formed in said void-forming crashpad-bumper portion to enhance flexibility and softness.

3. The structure of claim 1 wherein said trim-edge portion has a J-shaped configuration and further lip means integral with said extruded body in engagement with said L-shaped bracket.

4. The structure of claim 3 wherein a pair of lip means are provided of which one defines an intermediate cavity into which said bracket terminates in a location remote from that engaged by said J-shaped trim-edge portion.

5. Combination structure, comprising, a vehicle shelf having a lamp mounting recess along an underside in a location adjacent to a downward blunt edging, an elastomeric strip means carried by said shelf adjacent to said edging and including an edge trim as well as internal void-forming portion that is a softened crashpad-bumper configuration, and a conductor retaining lip portion integral therewith from which insulated conductor means extend into the lamp mounting recess of the shelf.

6. The structure of claim 5 wherein said lip portion has a C-shape for conductor retention and is integral to one side of said internal void-forming portion along the underside of said shelf.

7. On a shelf having an edging along at least one side thereof and electrically energizable component means adjacent thereto, the combination therewith comprising an elastomeric strip means having integral crashpad-bumper, edge trim and conductor enclosure portions of a continuous longitudinal configuration and pre-determined cross section that fits complementary to said shelf edging and internal recess forming means adjacent the edging of said shelf extending longitudinally and intermediate said edge trim and conductor enclosure portions for adding resilience to said crashpad-bumper portion.

References Cited
UNITED STATES PATENTS

| | | | |
|---|---|---|---|
| 896,463 | 8/1908 | Robinson | 174—48 X |
| 1,738,295 | 12/1929 | Hardy | 49—489 |
| 1,794,102 | 2/1931 | Comins | 174—70.3 X |
| 3,072,735 | 1/1963 | Umanoff | 174—70.3 |
| 3,118,017 | 1/1964 | Wimbesh | 174—97 |

FOREIGN PATENTS

| | | |
|---|---|---|
| 216,699 | 8/1961 | Austria. |
| 919,515 | 2/1963 | Great Britain. |
| 45,622 | 5/1962 | Poland. |

ROY D. FRAZIER, *Primary Examiner.*

CLAUDE A. LE ROY, *Examiner.*

A. FRANKEL, *Assistant Examiner.*